(12) United States Patent
Hall et al.

(10) Patent No.: US 8,279,565 B2
(45) Date of Patent: Oct. 2, 2012

(54) METHODS AND SYSTEMS RELATING TO OVERCURRENT CIRCUIT PROTECTION

(75) Inventors: Duane O. Hall, Sandy, UT (US); D. George Field, Pleasant Grove, UT (US); E. Carl Goodman, Bountiful, UT (US); Kevin D. Banta, Cedar Hills, UT (US)

(73) Assignee: Won-Door corporation, Salt Lake City, UT (US)

( * ) Notice: Subject to any disclaimer, the term of this patent is extended or adjusted under 35 U.S.C. 154(b) by 430 days.

(21) Appl. No.: 12/389,642

(22) Filed: Feb. 20, 2009

(65) Prior Publication Data

US 2010/0214709 A1 Aug. 26, 2010

(51) Int. Cl.
H02H 7/08 (2006.01)
(52) U.S. Cl. ............ 361/31; 361/29; 318/432; 318/434; 340/648
(58) Field of Classification Search .................. 361/1, 5, 361/23, 24, 28, 29, 31, 78, 79, 87, 93.1, 93.9, 361/94; 340/657, 664, 648, 527; 318/432, 318/434, 490, 757, 778
See application file for complete search history.

(56) References Cited

U.S. PATENT DOCUMENTS

| | | | | |
|---|---|---|---|---|
| 3,633,073 A * | 1/1972 | Day et al. | | 361/22 |
| 4,432,031 A * | 2/1984 | Premerlani | | 361/97 |
| 4,743,916 A * | 5/1988 | Bengeult | | 343/785 |
| 4,953,053 A * | 8/1990 | Pratt | | 361/31 |
| 4,973,896 A * | 11/1990 | Shiga et al. | | 322/28 |
| 5,040,088 A * | 8/1991 | Harrington et al. | | 361/31 |
| 5,057,987 A * | 10/1991 | Kumar et al. | | 363/58 |
| 5,189,589 A * | 2/1993 | Marschall | | 361/93.2 |
| 5,530,613 A | 6/1996 | Bauer et al. | | |
| 5,552,685 A * | 9/1996 | Young et al. | | 318/400.32 |
| 5,574,352 A * | 11/1996 | Endo et al. | | 318/802 |
| 5,617,281 A * | 4/1997 | Bauer et al. | | 361/27 |
| 5,666,066 A * | 9/1997 | Jo | | 324/765.01 |
| 5,703,463 A | 12/1997 | Smith | | |
| 5,784,232 A | 7/1998 | Farr | | |
| 5,856,711 A * | 1/1999 | Kato et al. | | 307/10.6 |
| 6,055,145 A * | 4/2000 | Lagree et al. | | 361/93.1 |
| 6,078,160 A | 6/2000 | Cilluffo | | |
| 6,170,241 B1 * | 1/2001 | Shibilski et al. | | 56/11.9 |
| 6,205,010 B1 * | 3/2001 | Ohsaka et al. | | 361/103 |
| 6,650,245 B2 * | 11/2003 | Chung | | 340/648 |
| 6,662,848 B2 | 12/2003 | Goodman et al. | | |
| 6,738,246 B1 | 5/2004 | Strumpler | | |
| 6,760,207 B2 * | 7/2004 | Wyatt et al. | | 361/93.1 |
| 6,760,437 B1 | 7/2004 | Lim | | |
| 6,765,776 B2 * | 7/2004 | Kelwaski | | 361/93.9 |
| 6,947,271 B1 | 9/2005 | Gronowicz, Jr. | | |
| 6,989,976 B2 | 1/2006 | Ashiya | | |
| 7,050,283 B2 | 5/2006 | Field et al. | | |
| 7,121,773 B2 * | 10/2006 | Mikiya et al. | | 408/5 |
| 7,292,418 B2 | 11/2007 | Egner | | |
| 7,352,150 B2 * | 4/2008 | Fujinaka et al. | | 318/685 |
| 7,352,545 B2 * | 4/2008 | Wyatt et al. | | 361/31 |
| 7,352,546 B2 | 4/2008 | Wang et al. | | |

(Continued)

Primary Examiner — Rita Leykin
(74) Attorney, Agent, or Firm — TraskBritt

(57) ABSTRACT

Systems and methods for providing overcurrent circuit protection are disclosed. A method of providing overcurrent circuit protection may include setting a threshold current value according to an operational state of a motor and sensing an amount of current being supplied to the motor. The method may further include electrically isolating the motor from a current source if the sensed current amount is greater than the threshold current value.

37 Claims, 6 Drawing Sheets

U.S. PATENT DOCUMENTS

| | | | |
|---|---|---|---|
| 7,420,343 B2 * | 9/2008 | Cook | 318/430 |
| 7,521,892 B2 * | 4/2009 | Funabashi et al. | 320/114 |
| 7,542,250 B2 * | 6/2009 | Premerlani et al. | 361/2 |
| 7,843,675 B2 * | 11/2010 | Hirata | 361/93.1 |
| 2004/0184206 A1 * | 9/2004 | Nomura et al. | 361/31 |
| 2006/0002043 A1 | 1/2006 | DiSalvo et al. | |
| 2007/0176578 A1 | 8/2007 | Tsugawa et al. | |
| 2008/0129267 A1 | 6/2008 | Lenz | |
| 2008/0165461 A1 | 7/2008 | Paik et al. | |
| 2008/0197808 A1 | 8/2008 | Banta et al. | |
| 2011/0184560 A1 * | 7/2011 | Brickell et al. | 700/275 |

* cited by examiner

METHODS AND SYSTEMS RELATING TO OVERCURRENT CIRCUIT PROTECTION

TECHNICAL FIELD

Embodiments of the present invention relate generally to overcurrent circuit protection and, more specifically, to systems and methods for providing microprocessor-based, variable threshold level overcurrent circuit protection.

BACKGROUND

Control circuitry for an electrical load, such as a motor, generally includes a protection device, such as a fuse, for deactivating the motor based on various operating conditions and the loading on the electric motor. Generally, a protection device is configured to interrupt the current to the motor when the current exceeds a predetermined threshold.

As understood by one of ordinary skill in the art, positive temperature coefficient (PTC) materials are commonly used to protect an electrical circuit from overcurrent conditions. Such materials exhibit an electrical resistivity that is relatively low at a design operating temperature band and increases abruptly, as the temperature of the material rises beyond a critical temperature. As also understood by one of ordinary skill in the art, a PTC overcurrent protection device may be placed in series with a load (e.g., a motor) and under normal operating conditions may operate in a low temperature, low resistance state. However, if the current through the PTC overcurrent protection device increases excessively, the ambient temperature around the PTC overcurrent protection device increases excessively, and/or the normal operating current is maintained for more than the normal operating time, the PTC overcurrent protection device will be "tripped," and converted to a high temperature, high resistance state such that the current through the PTC overcurrent protection device is substantially reduced.

Referring now to FIG. 1, a simplified block diagram of a conventional motor control system 100 is illustrated. Motor control system 100 includes a power source 102, control circuitry 104, and an electrical load 106, such as a motor. Additionally, control circuitry 104 includes a PTC overcurrent protection device 108. In operation, as the amount of current flowing from power source 102 though PTC overcurrent protection device 108 to electrical load 106 increases, resistive heating of PTC overcurrent protection device 108 occurs and, at a temperature threshold, the resistance of PTC overcurrent protection device 108 increases to limit the amount of current flowing therethrough. When PTC overcurrent protection device 108 cools, it may return to the lower impedance state allowing more current to flow therethrough. Because overcurrent protection utilizing a PTC device involves a thermal process, an unacceptable time delay occurring between application of an unsafe current (i.e., a current above a threshold value) and the limitation of the current may exist. As such, circuit components may be susceptible to unsafe currents and, as a result, may be damaged. Furthermore, once a PTC device is "tripped," user interaction may be required to reset the device.

A need exists to enhance systems and methods for overcurrent circuit protection. Specifically, there is a need for systems and methods for providing overcurrent circuit protection in a sufficiently fast and variable manner to protect circuit components from dangerous current levels. Additionally, there is a need for systems and methods for automatically restoring a power source connection once an over current condition is no longer present.

BRIEF SUMMARY OF THE INVENTION

In one embodiment of the present invention, a method of operating an overcurrent protection control system is disclosed. The method may include monitoring an operational state of a motor and defining a threshold current value of the motor according to the operational state of the motor. The method may further include sensing an amount of current being supplied from a power source to the motor and comparing the sensed current amount and the threshold current value. The method may also include electrically isolating the power source from the motor if the sensed current amount exceeds the threshold current value.

In another embodiment of the present invention, a method of providing overcurrent circuit protection is provided. The method may include defining a threshold current value according to an operational state of a motor and sensing an amount of current being supplied to the motor. The method may further include electrically isolating the motor from a current source if the sensed current amount is greater than the threshold current value.

Another embodiment of the present invention may include an overcurrent protection control system. The overcurrent protection control system may include a motor control device operably coupled to an electrical load and a microprocessor operably coupled to the motor control device. The microprocessor may be configured to receive one or more status signals indicative of an operational state of the electrical load. The microprocessor may be further configured to set a threshold current value according to the operational state of the electrical load. The overcurrent protection control system may further include a current sensor operably coupled between a power source and the motor control device and configured to sense an amount of current delivered to the load. The current sensor may be further configured to convey a signal to the microprocessor indicative of the sensed current amount. The overcurrent protection control system may also include a switching element operably coupled between the power source and the motor control device and configured to receive a signal from the microprocessor. The microprocessor is further configured to compare the sensed current amount with the threshold current value and convey a signal to the switching element to cause the switching element to either electrically isolate the power source from the motor control device or electrically couple the power source to the motor control device.

Another embodiment of the present invention may include a motor control device operably coupled between a power source and a motor. The motor control device may include a microprocessor configured to define and store a threshold current value according to an operational state of the motor and a current sensor operably coupled between a power source and the motor and configured to sense an amount of current delivered to the motor. The current sensor may be further configured to convey a signal to the microprocessor indicative of the sensed current amount. Moreover, the microprocessor may be further configured to compare the sensed current amount and the threshold current value and convey a signal to a switching element to cause the switching element to electrically isolate the motor from the motor control device and the power source if the sensed current amount is greater than the threshold current value. Furthermore, the switching element may be operably coupled between the motor control device and the motor and may be configured to receive a signal from the microprocessor and either electrically isolate the motor from the motor control device and the power source or electrically couple the motor to the motor control device.

The system may include additional components depending, for example, on the intended application of the motor. For example, in one embodiment the motor may be operably coupled to a portion of a movable partition in order to deploy and retract or otherwise displace the partition. Such a partition may include, for example, a folding or accordion-style door having a plurality of hingedly coupled panels. The partition may be configured as a fire barrier in one particular example. Of course, the system may include other components and be configured for other applications as will be appreciated by those of ordinary skill in the art.

DETAILED DESCRIPTION OF THE INVENTION

In the following description, circuits may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be appreciated by those of ordinary skill in the art that the present invention may be practiced by numerous other partitioning solutions. For the most part, details concerning timing considerations, and the like, have been omitted inasmuch as such details are not necessary to obtain a complete understanding of the present invention and are within the ability of persons of ordinary skill in the relevant art.

The terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

The term "bus" is used to refer to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
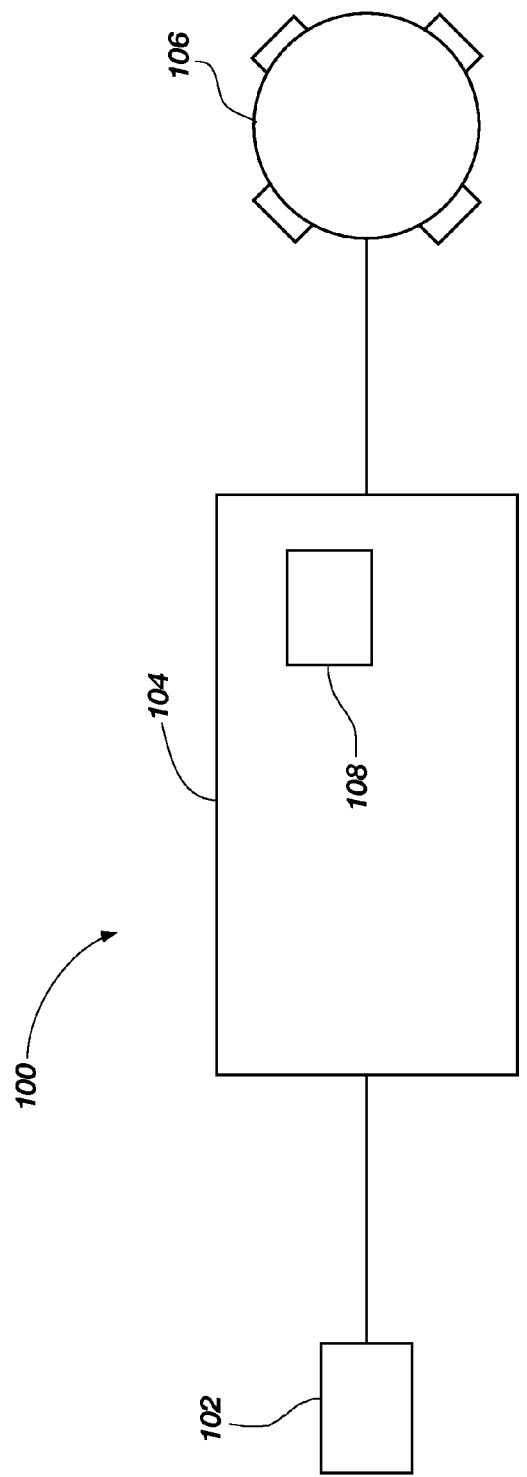
FIG. 1 is a simplified block diagram of a conventional motor control system.
Figure 2:
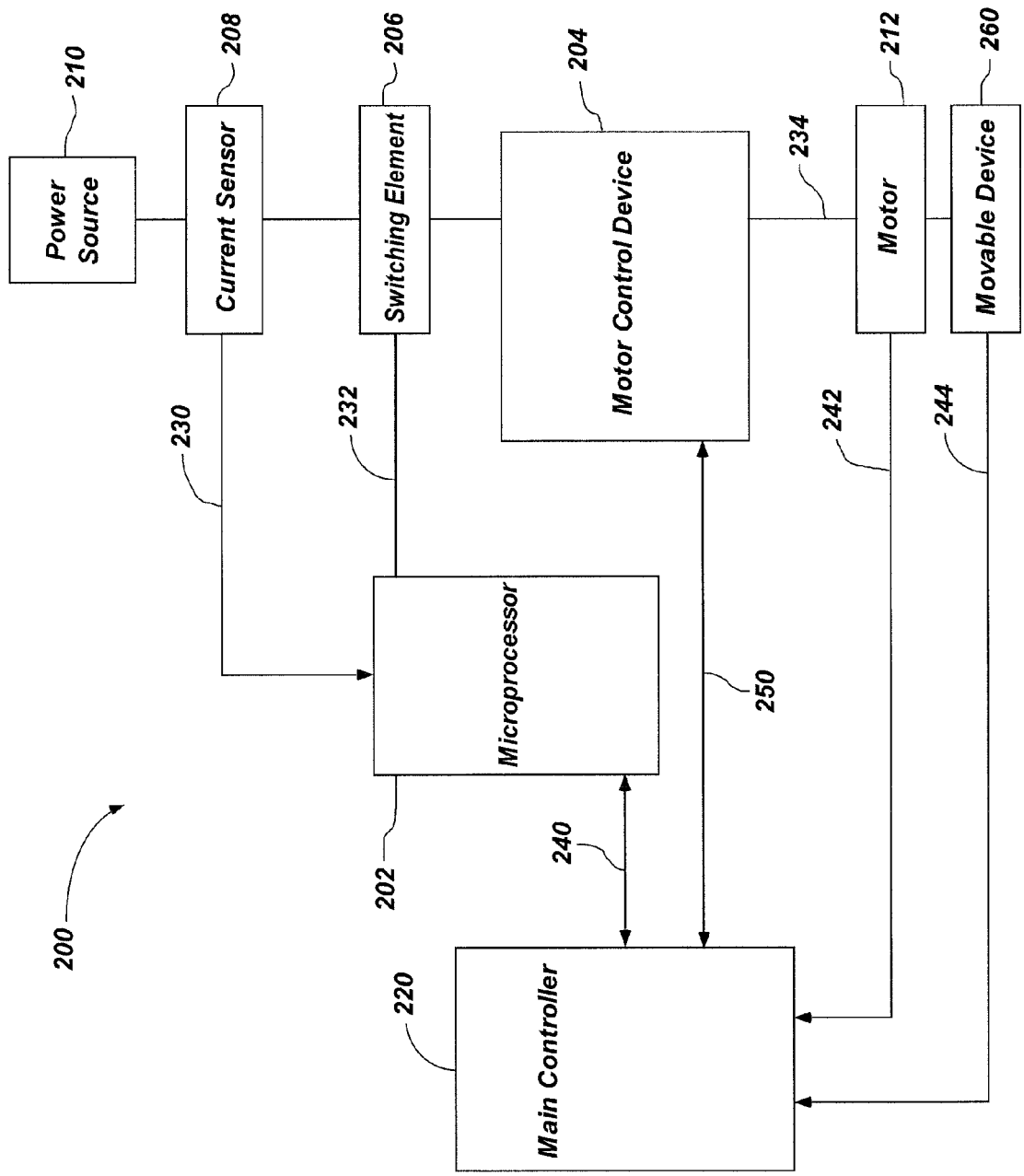
FIG. 2 is a block diagram of a control system including a microprocessor, a current sensor, a motor control device, and a switching element, according to an embodiment of the present invention.

FIG. 2 illustrates an overcurrent circuit protection control system 200 in accordance with an embodiment of the present invention. For example only, the control system 200 of the present invention may be used to control a motor in association with a variety of applications. As an example, in one embodiment, the control system 200 may be used to control a motor shaft of a movable door or a movable partition, such as is described in U.S. Pat. No. 6,662,848 entitled AUTOMATIC DOOR AND METHOD OF OPERATING SAME, the contents of which are hereby incorporated by reference. Of course, numerous other applications are contemplated as will be appreciated by those of ordinary skill in the art.

As described more fully below, control system 200 may be configured to monitor an operational state or status of a load and adjust a threshold current value of control system 200 depending on the operational state of the load. Moreover, control system 200 may be configured to electrically isolate the load from a power source in the event a current supplied from the power source to the load exceeds the threshold current value. Control system 200 includes a motor control device 204, a power source 210, a switching element 206, and a current sensor 208. Motor control device 204 may comprise a motor control board including a microprocessor (not shown) and motor control circuitry (not shown). Moreover, control system 200 includes a load 212 operably coupled to a movable device 260, such as a movable door or a movable partition. For explanation purposes only, load 212 will hereinafter comprise and be referred to as a motor 212. Motor 212 may be operably coupled to an output of motor control device 204 and may comprise, for example only, a reversible DC motor. Power source 210 may be operably coupled to motor control device 204 and may be configured to provide a voltage suitable for driving a DC motor rated at 12 volts DC or higher, such as a 24-volt DC motor.

Control system 200 may also include a main controller 220 operably coupled to a microprocessor 202 via bus 240. Main controller 220 may be any suitable controller and may be configured to, for example only, monitor the state of motor 212 or a movable device 260 (e.g., a movable door or a movable partition) driven by motor 212, monitor other aspects related to the control of movable device 260, and thereby operate movable device 260 under a defined set of parameters or rules. As illustrated, main controller 220 may be communicatively coupled to motor 212 and movable device 260 via respective signals 242 and 244. Main controller 220 may be further configured to transmit one or more control signals via bus 250 to motor control device 204 related to an operation of movable device 260, such as, for example only, an "open" operation signal, a "close" operation signal, or a "brake" operation signal. Furthermore, as described more fully below, main controller 220 may be further configured to transmit one or more status signals via bus 240 to microprocessor 202 related to an operational state or status of motor 212, movable device 260, or any combination thereof. For example only, a status signal related to an operational state of movable device 260 may comprise an "alarm" or "fault" status signal, a "service" status signal, or a "moving" status signal. Furthermore, for example only, a status signal related to an operational state of motor 212 may comprise a "start up" status signal, a "steady state" status signal, or an "off" status signal.

As will be appreciated by one of ordinary skill in the art, a motor, such as motor 212, may require a variable amount of current depending on whether the motor is in, for example, a "start up" mode, a "steady state" mode, or an "off" mode. For example only, a motor may require a current of, for example only, 80 amps during a "start up" mode and a current of, for example only, 10-12 amps during a "steady state" mode. Additionally, a motor may require a variable amount of current depending on whether it is in a first time duration (e.g., the first 300 milliseconds) of a "start up" mode or a second time duration (e.g., between the first 300 milliseconds and 400 milliseconds) of a "start up" mode. Stated another way, a motor that is in a "start up" mode may require more current than a motor that is in a "steady state" mode. Furthermore, a motor may require more current during a first time duration of a "start up" mode than during a second time duration of the "start up" mode.

Microprocessor 202 may be any suitable microprocessor and may, as mentioned above, be configured to receive one or more status signals from main controller 220 related to an operational state or status of motor 212 (e.g., "off," "start-up," or "steady state"), movable device 260 (e.g., movable device 260 is moving or movable device 260 is not moving), or any combination thereof. Furthermore, microprocessor 202 may be configured to define and store a threshold current value of control system 200 depending on the operational state of motor 212, movable device 260, or any combination thereof.

According to one embodiment of the present invention, if motor 212 is in an "off" mode (i.e., motor 212 is not driving movable device 260), microprocessor 202 may set the threshold current value of control system 200 to an appropriate "off" current value, such as, for example only, five (5) amps. Furthermore, if motor 212 is in a "start up" mode (e.g., motor 212 has been consecutively driving movable device 260 for 400 milliseconds or less), microprocessor 202 may set the threshold current value of control system 200 to an appropriate "start up" current value, such as, for example only, eighty (80) amps. Moreover, if motor 212 is in a "steady state" mode (e.g., motor 212 has been consecutively driving movable device 260 for more than 400 milliseconds), microprocessor 202 may set the threshold current value of control system 200 to an appropriate "steady state" current value, such as, for example only, twelve (12) amps.

According to another embodiment of the present invention, if motor 212 is in an "off" mode (i.e., motor 212 is not driving movable device 260), microprocessor 202 may set the threshold current value of control system 200 to an appropriate "off" current value, such as, for example only, five (5) amps. Furthermore, if motor 212 is in a first time period of a "start up" mode (e.g., motor 212 has been consecutively driving movable device 260 for 300 milliseconds or less), microprocessor 202 may set the threshold current value of control system 200 to an appropriate "first duration start up" current value, such as, for example only, one hundred and twenty (120) amps. Additionally, if motor 212 is in a second time period of a "start up" mode (e.g., motor 212 has been consecutively driving movable device 260 for more than 300 milliseconds but not more than 400 milliseconds), microprocessor 202 may set the threshold current value of control system 200 to an appropriate "second duration start up" current value, such as, for example only, eighty (80) amps. Moreover, if motor 212 is in a "steady state" mode (e.g., motor 212 has been consecutively driving movable device 260 for more than 400 milliseconds), microprocessor 202 may set the threshold current value of control system 200 to an appropriate "steady state" current value, such as, for example only, twenty-five (25) amps. Accordingly, microprocessor 202 may be configured to receive a status signal from main controller 220 indicative of an operational state of motor 212, movable device 260, or any combination thereof. Furthermore, microprocessor 202 may be configured to keep track of the current operational state or status of motor 212, movable device 260, or any combination thereof. Additionally, microprocessor 202 may be configured to keep track of a time duration in which motor 212 or movable device 260 has been in its current operational state.

As illustrated in FIG. 2, microprocessor 202 may also be operably coupled to current sensor 208 and switching element 206. As described more fully below, microprocessor 202 may also be configured to receive a current status signal 230 from current sensor 208 and transmit an output control signal 232 to switching element 206. Current sensor 208 may be operably coupled between power source 210 and motor control device 204 and may be configured to sense an amount of current supplied from power source 210 to motor control device 204. Current sensor 208 may comprise any current sensor suitable for generating an analog or digital signal, wherein the signal is proportional to the amount of current flowing through current sensor 208. A current sensor that is configured to generate an analog signal may be coupled to an analog-to-digital input of microprocessor 202 to sample the input and convert it to a digital value suitable for use by software on microprocessor 202. A current sensor that is configured to generate a digital signal may directly interface to a serial or parallel port on microprocessor 202 to present a digital value suitable for use by software on microprocessor 202. Of course, a stand-alone analog-to-digital converter may also be used between current sensor 208 and microprocessor 202. For example only, and not by way of limitation, current sensor 208 may comprise a Hall Effect current sensor, as will be understood by a person having ordinary skill in the art.

Switching element 206 may be operably coupled between power source 210 and motor control device 204 and may be configured to receive output control signal 232 from microprocessor 202. Depending on the state of output control signal 232, switching element 206 may be configured to either operate in a conductive state and electrically couple power source 210 to motor control device 204 or operate in a non-conductive state and electrically isolate power source 210 from motor control device 204. For example only, and not by way of limitation, switching element 206 may comprise a Field Effect Transistor (FET). In this example, microprocessor 202 may be operably coupled to and configured to supply output control signal 232 to a gate of the FET to cause the FET to operate in either a conductive state or a non-conductive state. More specifically, microprocessor 202 may be configured to supply an asserted or negated output control signal 232 to the gate of the FET to cause the FET to operate in either a conductive state to electrically couple power source 210 to motor control device 204 or a non-conductive state to electrically isolate motor control device 204 from power source 210. It should be noted that, by default, control system 200 is configured such that power source 210 is electrically coupled to motor control device 204 and motor 212 and, therefore, by default, control system 200 is configured such that switching element 206 operates in a conductive state.

Figure 3:
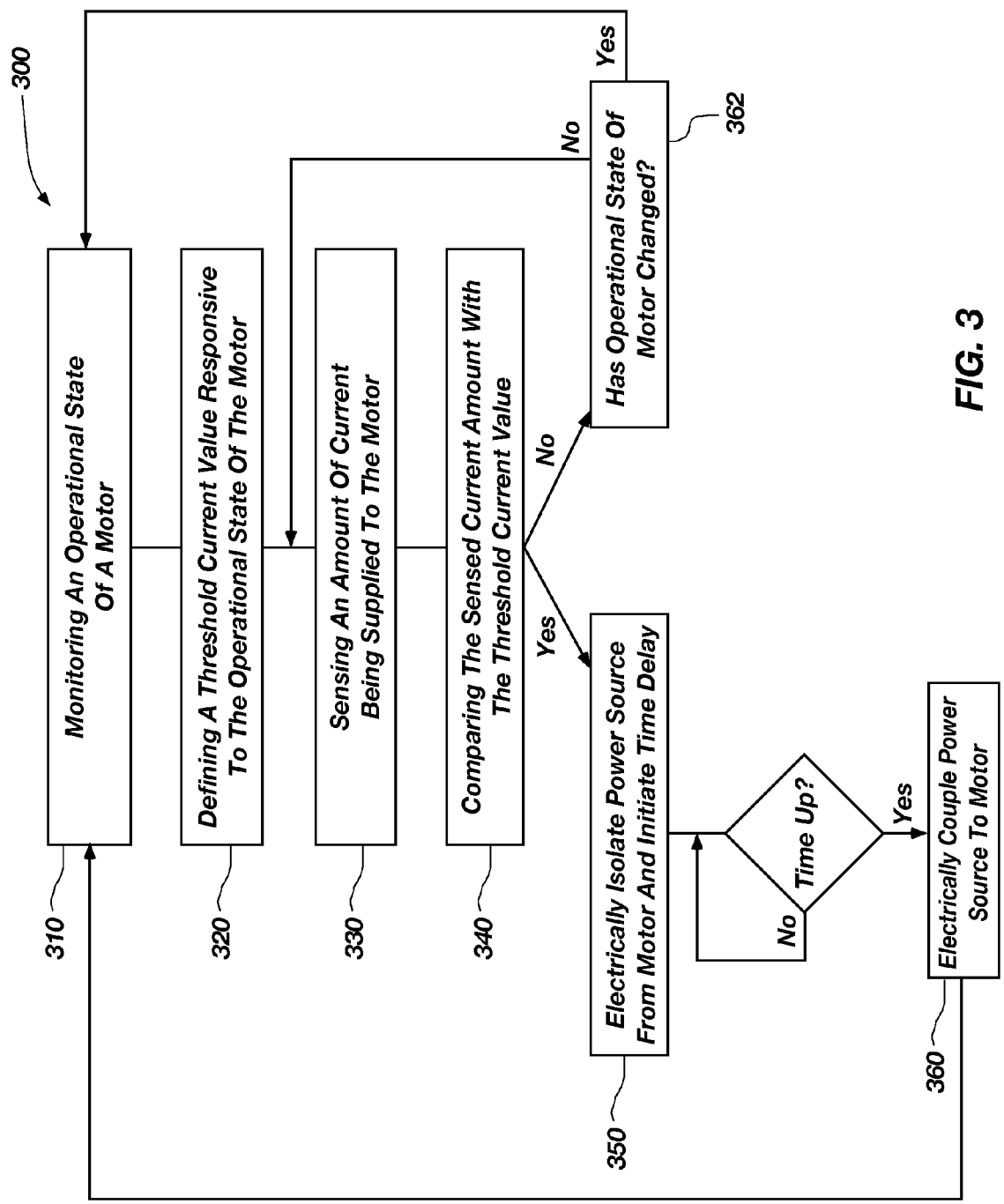
FIG. 3 is a chart illustrating a method of operating an overcurrent circuit protection control system, in accordance with an embodiment of the present invention.

With reference to FIGS. 2 and 3, a contemplated method 300 of operating overcurrent circuit protection control system 200 will now be discussed. Method 300 of operating control system 200 may include monitoring an operational state or status of motor 212, movable device 260 (e.g., movable device 260 is moving or movable device 260 is not moving) driven by motor 212, or any combination thereof (depicted by numeral 310). More specifically, upon a change in the operational state or status of motor 212 or movable device 260, microprocessor 202 may receive a status signal from main controller 220 indicative of the current operational state or status of motor 212, movable device 260, or any combination thereof. Method 300 may further include defining a threshold current value in accordance with the operational state of the motor (depicted by numeral 320). More specifically, upon receipt of a status signal, microprocessor 202 may set a stored threshold current value in accordance with the operational state or status of the motor 212, movable device 260, or any combination thereof. Moreover, method 300 may include sensing an amount of current being supplied to motor control device 204 and motor 212 (depicted by numeral 330). More specifically, current sensor 208 may sense an amount of current supplied from power source 210 to motor control device 204 and motor 212 and send a signal to microprocessor 202 indicative of the sensed current amount.

Furthermore, method 300 may include comparing the sensed current amount with the threshold current value (depicted by numeral 340) and electrically isolating motor control device 204 and motor 212 from a power source 210 if the sensed current exceeds the threshold current value (depicted by numeral 350). More specifically, microprocessor 202 may compare the sensed current amount to the stored threshold current value and, in the event that the sensed current amount exceeds the stored threshold current value, microprocessor 202 may send a signal to switching element 206 to electrically isolate motor control device 204 and motor 212 from power source 210.

For example only, upon detection of an overcurrent condition, microprocessor 202, in conjunction with switching element 206, may electrically isolate motor control device 204 and motor 212 from power source 210 and initiate a time delay (depicted by numeral 350), such as, for example only, 1.5 seconds. After completion of the time delay, motor control device 204 and motor 212 may again be electrically coupled to power source 210 (depicted by numeral 360). Thereafter, method 300 may return to the step depicted by numeral 310. Current sensor 208 may then sense the amount of current supplied to motor 212, the sensed current may be compared to the stored threshold current value and, in the event that the overcurrent condition still exists, motor control device 204 and motor 212 may be electrically isolated from power source 210. This process may be repeated until the overcurrent condition is removed. It should be noted that control system 200 may be configured to detect an overcurrent condition and electrically isolate motor control device 204 and motor 212 from power source 210 in substantially 200 microseconds or less. Furthermore, it also should be noted that, by default, power source 210 is electrically coupled to motor control device 204 and motor 212 and, therefore, by default, switching element 206 operates in a conductive state.

Figure 4:
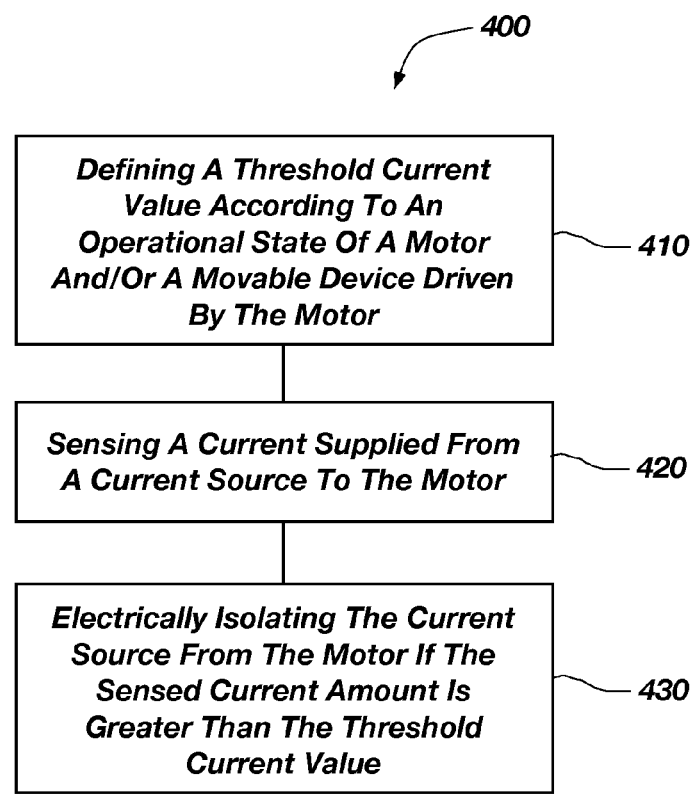
FIG. 4 is a chart illustrating a method of providing overcurrent circuit protection, according to an embodiment of the present invention.

With reference to FIGS. 2 and 4, a contemplated method 400 of providing overcurrent circuit protection will now be discussed. A method of providing overcurrent protection may include defining and storing a threshold current value according to an operational state of a motor 212, movable device 260, or any combination thereof (depicted by numeral 410). The method may further include sensing a current supplied from a current source to the motor 212 (depicted by numeral 420). Furthermore, the method may include electrically isolating the current source from the motor if the sensed current amount is greater than the threshold current value (depicted by numeral 430).

Figure 5:
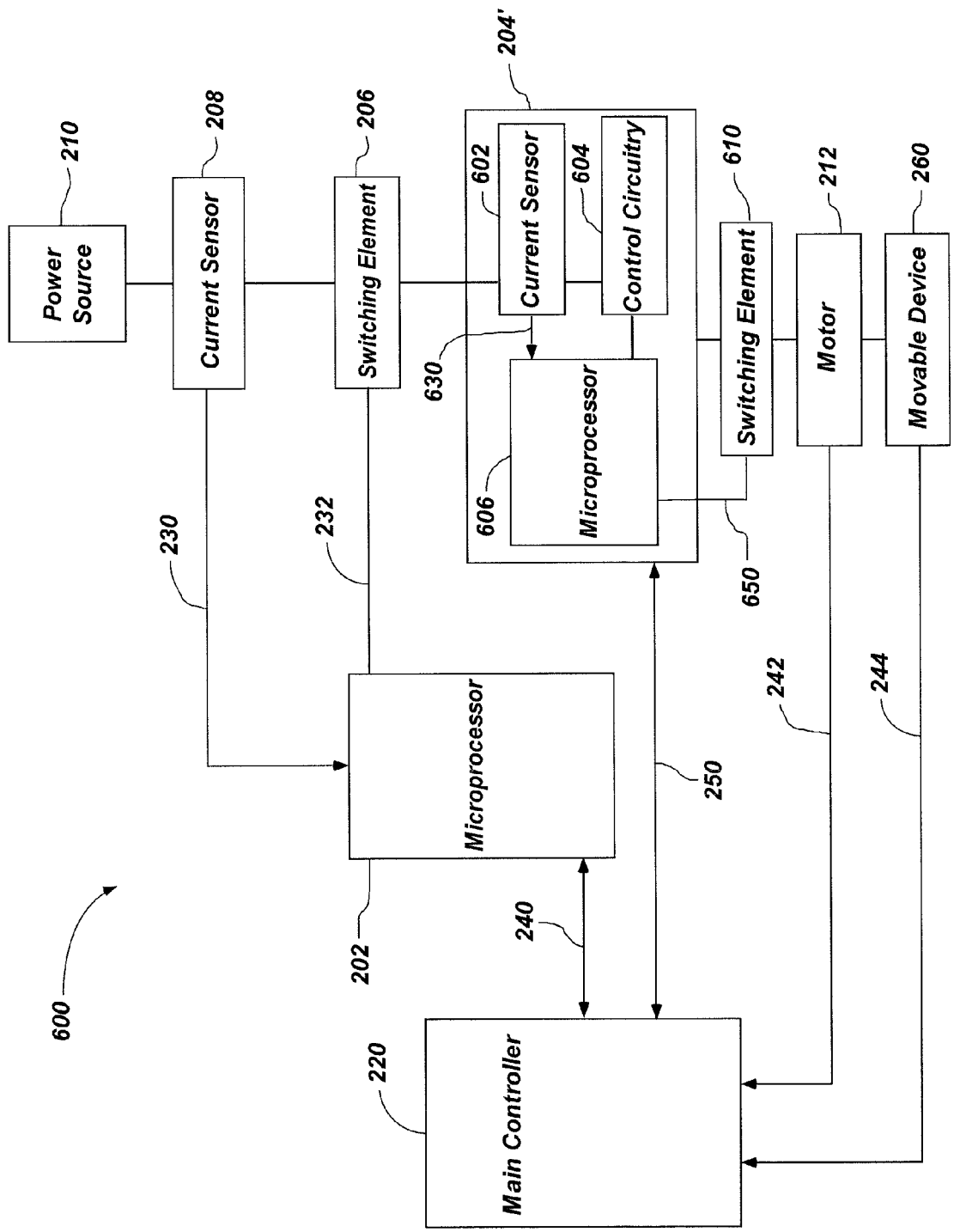
FIG. 5 is a block diagram of a control system including a motor control device having a microprocessor, a current sensor and control circuitry, according to an embodiment of the present invention.

FIG. 5 illustrates another overcurrent circuit protection control system 600 in accordance with an embodiment of the present invention. Control system 600 includes power source 210, switching element 206, main controller 220, microprocessor 202, motor 212, movable device 260, and current sensor 208, each configured to operate in the manner as described above with reference to FIG. 2. Furthermore, control system 600 includes motor control device 204' and a switching element 610. Furthermore, in this embodiment, motor control device 204' may include another microprocessor 606, another current sensor 602, and control circuitry 604. Microprocessor 606 may be any suitable microprocessor and may be configured to receive one or more status signals from main controller 220 related to an operational state or status of motor 212 (e.g., "off," "start-up," or "steady state"), movable device 260 (e.g., movable device 260 is moving or movable device 260 is not moving), or any combination thereof. Furthermore, microprocessor 606 may be configured to define and store a threshold current value of control system 600 depending on the operational state of motor 212, movable device 260, or any combination thereof. Furthermore, microprocessor 606 may be configured to keep track of the current operational state or status of motor 212, movable device 260, or any combination thereof. Additionally, microprocessor 606 may be configured to keep track of a time duration in which motor 212 or movable device 260 has been in its current operational state.

Current sensor 602 may be operably coupled between power source 210 and motor 212 and may be configured to sense an amount of current being supplied to motor 212. Similarly to current sensor 208, current sensor 602 may comprise any current sensor suitable for generating an analog or digital signal wherein the signal is proportional to the amount of current flowing through current sensor 602. For example only, and not by way of limitation, current sensor 602 may comprise a Hall Effect current sensor. Microprocessor 606 may also be configured to receive a current status signal 630 from current sensor 602 indicative of an amount of current flowing through current sensor 602. Upon receipt of current status signal 630, microprocessor 606 may be configured to compare the sensed current amount (i.e., the amount of current flowing through current sensor 602) with the defined threshold current value. Furthermore, microprocessor 606 may be operably coupled to and configured to supply output control signal 650 to switching element 610. For example, if the sensed current amount exceeds the threshold value defined and stored with microprocessor 606, microprocessor 606 may transmit output control signal 650 to switching element 206 to cause switching element 610 to operate in a non-conductive state and electrically isolate motor 212 from power source 210.

Switching element 610 may be operably coupled between motor 212 and motor control device 204' and may be configured to receive output control signal 650 from microprocessor 606. Depending on the state of output control signal 650, switching element 610 may be configured to either operate in a conductive state and, depending on state of switching element 206, couple power source 210 to motor 212 or operate in a non-conductive state and electrically isolate motor 212 from power source 210. For example only, and not by way of limitation, switching element 610 may comprise a Field Effect Transistor (FET). In this example, microprocessor 606 may be operably coupled to and configured to supply an asserted or negated output control signal 650 to a gate of the FET to cause the FET to operate in either a conductive state or a non-conductive state.

Figure 6:
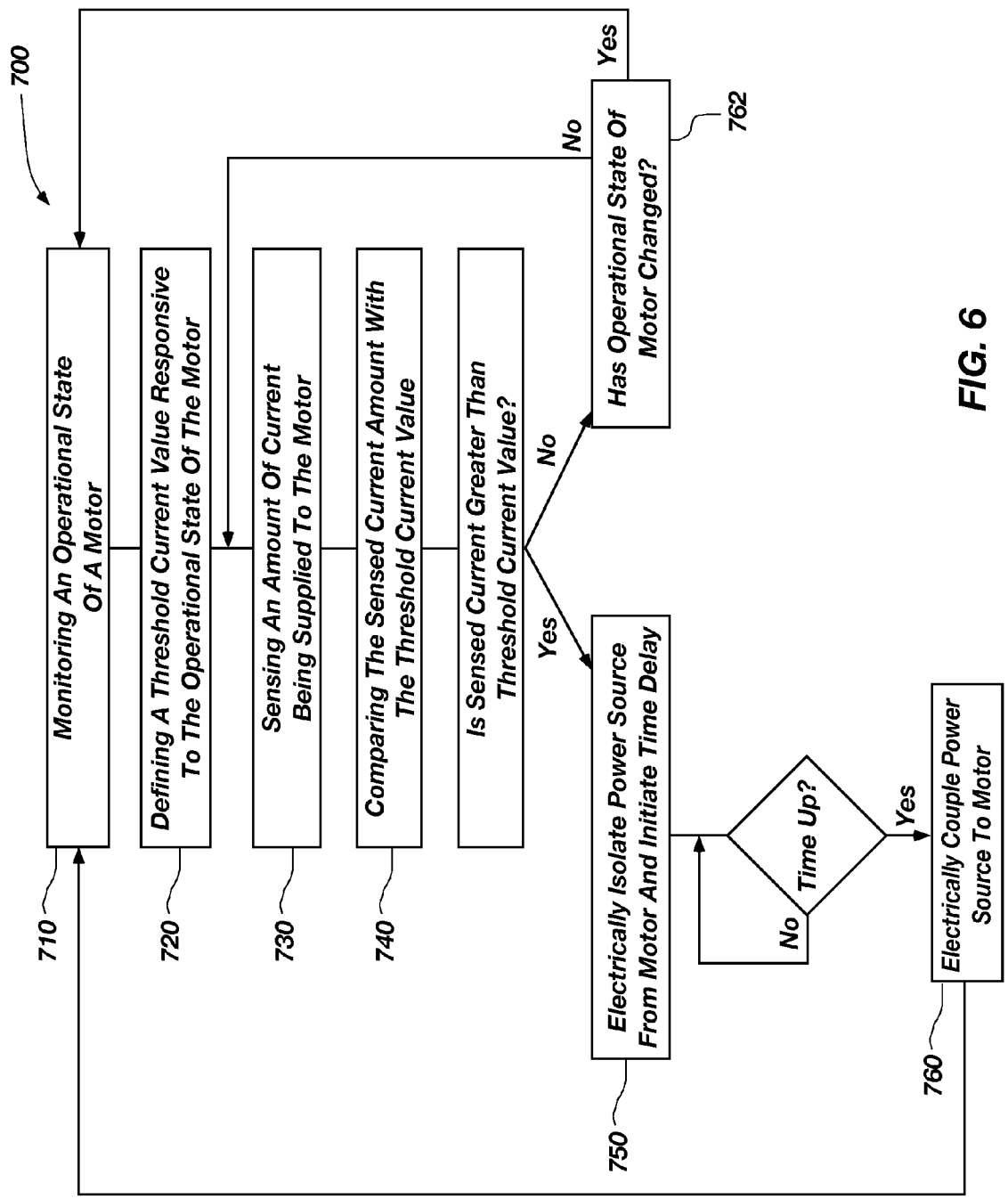
FIG. 6 is a chart illustrating a method of operating another overcurrent circuit protection control system, in accordance with an embodiment of the present invention.

With reference to FIGS. 5 and 6, a contemplated method 700 of operating overcurrent circuit protection control system 600 will now be discussed. Method 700 of operating control system 600 may include monitoring an operational state or status of motor 212, movable device 260 (e.g., movable device 260 is moving or movable device 260 is not moving) driven by motor 212, or any combination thereof (depicted by numeral 710). More specifically, upon a change in the operational state or status of motor 212 or movable device 260, microprocessor 606 may receive a status signal from main controller 220 indicative of the current operational state or status of motor 212, movable device 260, or any combination thereof. Method 700 may further include defining a threshold current value in accordance with the operational state of the motor (depicted by numeral 720). More specifically, upon receipt of a status signal, microprocessor 606 may set a stored threshold current value in accordance with the operational state or status of the motor 212, movable device 260, or any combination thereof. Moreover, method 700 may include sensing an amount of current being supplied to motor 212 (depicted by numeral 730). More specifically, current sensor 602 may sense an amount of current supplied from power source 210 to motor 212 and send a signal to microprocessor 606 indicative of the sensed current amount.

Furthermore, method 700 may include comparing the sensed current amount with the threshold current value (depicted by numeral 740) and electrically isolating motor 212 from power source 210 if the sensed current exceeds the threshold current value (depicted by numeral 750). More specifically, microprocessor 606 may compare the sensed current amount to the stored threshold current value and, in the event that the sensed current amount exceeds the stored threshold current value, microprocessor 606 may send a signal to switching element 610 to electrically isolate motor 212 from power source 210.

For example only, upon detection of an overcurrent condition, microprocessor 606, in conjunction with switching element 610, may electrically isolate motor 212 from power source 210 and initiate a time delay (depicted by numeral 750), such as, for example only, 1.5 seconds. After completion of the time delay, motor 212 may again be electrically coupled to power source 210 (depicted by numeral 760). Thereafter, method 700 may return to the step depicted by numeral 710. Current sensor 602 may then sense the amount of current supplied to motor 212, the sensed current may be compared to the stored threshold current value and, in the event that the overcurrent condition still exists, motor 212 may be electrically isolated from power source 210. This process may be repeated until the overcurrent condition is removed. It should be noted that control system 600 may be configured to detect an overcurrent condition and electrically isolate motor 212 from power source 210 in substantially 200 microseconds or less.

As described in the various embodiments above, overcurrent circuit protection control systems 200/600 may each be configured to track an amount of current used by a device (e.g., a motor) and compare the current usage with, for example, a predetermined usage model of the device in order to determine whether the device is operating within its operational parameters. Furthermore, in the event an overcurrent condition exists, overcurrent circuit protection control systems 200/600 may each be configured to disconnect the device from a power source in a short period of time (e.g., 200 microseconds) and, thus avoid thermal delays inherent with conventional PTC devices.

It will be appreciated by a person having ordinary skill in the art that, in contrast to overcurrent protection systems utilizing conventional PTC devices, overcurrent circuit protection control systems 200/600 may be configured to automatically restore current to a motor control device and/or a motor once an overcurrent condition is no longer present.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A method of operating an overcurrent protection control system, comprising;
monitoring an operational state of a motor;
defining a first threshold current value of the control system corresponding to a first operational state of the motor;
defining a second threshold current value of the control system corresponding to a second operational state of the motor;
sensing an amount of current being supplied from a power source to the motor;
dynamically setting an operational threshold current value depending on the monitored operational state of the motor, wherein the dynamically set operational threshold current value is set at the first threshold current value if the motor is determined to be operating in the first operational state, and wherein the dynamically set operational threshold current value is set at the second threshold current value if the motor is determined to be operating in the second operating state;
comparing the sensed current amount and the dynamically set operational threshold current value; and
electrically isolating the power source from the motor if the sensed current amount exceeds the dynamically set operational threshold current value.

2. The method of claim 1, wherein electrically isolating the power source from the motor comprises conveying a signal from a microprocessor to a gate of a Field Effect Transistor (FET) operably coupled between the power source and the motor to cause the Field Effect Transistor (FET) to operate in a non-conductive state.

3. The method of claim 1, wherein defining a first threshold current value comprises defining the first threshold current value as an "off" current value drawn by the motor while the motor is in an "off" operational state.

4. The method of claim 1, wherein defining a first threshold current value comprises defining the first threshold current value as a "first duration start up" current value drawn by the motor while the motor is in a first time period of a "start up" operational state.

5. The method of claim 1, wherein defining a second threshold current value comprises defining the second threshold current value as a "second duration start up" current value drawn by the motor while the motor is in a second time period of a "start up" operational state.

6. The method of claim 1, wherein defining a second threshold current value comprises defining the second threshold current value as a "steady state" current value drawn by the motor while the motor is in a "steady state" operational state.

7. The method of claim 1, wherein sensing an amount of current comprises sensing an amount of current being supplied from the power source to the motor with a Hall Effect current sensor.

8. The method of claim 1, wherein monitoring an operational state of a motor comprises receiving one or more status signals at a microprocessor indicative of the operational state of the motor.

9. The method of claim 1, further comprising initiating a time delay after electrically isolating the power source from the motor and electrically coupling the power source to the motor upon completion of the time delay.

10. The method of claim 9, wherein initiating a time delay comprises initiating a time delay of 1.5 seconds.

11. The method of claim 1, wherein defining a first threshold current value comprises defining the first threshold current value as a "start up" current value drawn by the motor while the motor is in a "start up" operational state.

12. The method of claim 1, wherein sensing an amount of current, comparing the sensed current amount and the dynamically set operational threshold current value, and electrically isolating the power source from the motor is affected in substantially 200 microseconds or less.

13. The method of claim 1, wherein comparing the sensed current amount and the operational threshold current value further comprises:
disregarding the second threshold current value if the motor is operating in the first operational state; and
disregarding the first threshold current value if the motor is operating in the second operational state.

14. A method of providing overcurrent circuit protection, comprising:
dynamically changing an operational threshold current value between at least two threshold current values associated with different operational states of a motor responsive to a determined operational state of the motor;
sensing an amount of current being supplied to the motor; and
electrically isolating the motor from a power source if the sensed current amount is greater than the operational threshold current value.

15. The method of claim 14, further comprising initiating a time delay after electrically isolating the motor from the power source and electrically coupling the power source to the motor upon completion of the time delay.

16. The method of claim 15, wherein initiating a time delay comprises initiating a time delay of 1.5 seconds.

17. The method of claim 14, wherein dynamically changing an operational threshold current value between at least two threshold current values associated with different operational states of the motor includes:
defining a first threshold current value associated with a first operational state of the motor;
defining a second threshold current value associated with a second operational state of the motor;
setting the operational threshold current value to be the first threshold current value when the motor is determined to be operating in the first operational state; and
setting the operational threshold current value to be the second threshold current value when the motor is determined to be operating in the second operational state.

18. The method of claim 14, wherein isolating the motor from the power source if the sensed current amount is greater than the operational threshold current value further comprises:
isolating the motor if the sensed current amount is greater than only one of the first threshold current value and the second threshold current value that corresponds to the operational state of the motor.

19. The method of claim 17, wherein defining a first threshold current value comprises defining and storing a first threshold current value in a microprocessor and wherein defining a second threshold current value comprises defining and storing a second threshold current value in a microprocessor.

20. The method of claim 17, wherein defining a first threshold current value comprises defining the first threshold current value corresponding to one of an "off" operational state of the motor, a "start up" operational state of the motor, and a "steady state" operational state of the motor.

21. The method of claim 20, wherein electrically isolating the motor from the power source comprises comparing the sensed current amount and the operational threshold current value with a microprocessor and transmitting a signal to a switching element to electrically isolate the motor from the power source if the sensed current amount is greater than the operational threshold current value.

22. An overcurrent protection control system, comprising:
a motor control device operably coupled to an electrical load;
a microprocessor operably coupled to the motor control device and configured to receive one or more status signals indicative of an operational state of the electrical load;
a current sensor operably coupled between a power source and the motor control device and configured to sense an amount of current delivered to the motor control device, the current sensor further configured to convey a signal to the microprocessor indicative of the sensed current amount; and
a switching element operably coupled between the power source and the motor control device and configured to receive a signal from the microprocessor and either electrically isolate the power source from the motor control device or electrically couple the power source to the motor control device;
wherein the microprocessor is further configured to:
set an operational threshold current value to be a first threshold current value if the electrical load is determined to be operating in a first operational state;
set the operational threshold current value to be the second threshold current value if the electrical load is determined to be operating in a second operational state;
compare the sensed current amount and the set operational threshold current value; and
convey a signal to the switching element to cause the switching element to electrically isolate the power source from the motor control device if the sensed current amount is greater than the set operational threshold current value.

23. The overcurrent protection control system of claim 22, wherein the motor control device comprises:
another microprocessor configured to define and store another threshold current value corresponding to another operational state of the electrical load; and
another current sensor operably coupled between the power source and the motor and configured to sense another amount of current delivered to the motor, the another current sensor further configured to convey a signal to the another microprocessor indicative of the another sensed current amount;
wherein the another microprocessor is further configured to compare the another sensed current amount and the another threshold current value and convey a signal to another switching element to cause the another switching element to electrically isolate the motor from the power source if the another sensed current amount is greater than the another threshold current value.

24. The overcurrent protection control system of claim 22, wherein the current sensor comprises a Hall Effect current sensor.

25. The overcurrent protection control system of claim 22, wherein the microprocessor is configured to set at least one of the first threshold current value and the second threshold current value to an "off" current value when the motor is in an "off" operational state.

26. The overcurrent protection control system of claim 22, wherein the microprocessor is configured to initiate a time delay after sending a signal to the switching element to electrically isolate the power source from the motor control device and upon completion of the time delay to send a signal to the switching element to electrically couple the power source to the motor control device.

27. The overcurrent protection control system of claim 22, wherein the switching element comprises a Field Effect Transistor (FET).

28. The overcurrent protection control system of claim 22, wherein the microprocessor is further configured to convey the signal to the switching element to cause the switching element to electrically isolate the power source from the motor control device when the sensed current amount is greater than only the one of the first threshold current value and the second threshold current value for the corresponding operational state of the electrical load.

29. The overcurrent protection control system of claim 23, wherein the microprocessor is configured to set the first threshold current value to a "first duration start up" current value when the motor is in a first time duration of a "start-up" operational state.

30. The overcurrent protection control system of claim 29, wherein the microprocessor is configured to set the second threshold current value to a "second duration start up" current value when the motor is in a second time duration of a "start-up" operational state.

31. The overcurrent protection control system of claim 30, wherein the microprocessor is configured to set the another threshold current value to a "steady state" current value when the motor is in a "steady state" operational state.

32. The overcurrent protection control system of claim 23, wherein the overcurrent protection control system is configured to sense an amount of current delivered to the motor control device, compare the sensed current amount and the first, second, or another threshold current value, and electrically isolate the power source from the motor control device in substantially 200 microseconds or less.

33. The overcurrent protection control system of claim 27, wherein the microprocessor is configured to send a signal to a gate of the Field Effect Transistor (FET).

34. An overcurrent protection control system, comprising:
a motor control device operably coupled between a power source and a motor, the motor control device comprising:
a microprocessor configured to define and store a first threshold current value for a first operational state of the motor, and to define a second threshold current value for a second operational state of the motor; and
a current sensor operably coupled between the power source and the motor and configured to sense an amount of current delivered to the motor, the current sensor further configured to convey a signal to the microprocessor indicative of the sensed current amount;
wherein the microprocessor is further configured to:
compare the sensed current amount and the first threshold current value as an operational threshold current value during the first operational state of the motor;
compare the sensed current amount and the second threshold current value as the operational threshold current value during the second operational state of the motor; and
convey a signal to a switching element coupled between the motor control device and the motor to cause the switching element to electrically isolate the motor from the motor control device and the power source if the sensed current amount is greater than the operational threshold current value.

35. The overcurrent protection control system of claim 34, wherein the microprocessor is configured to initiate a time delay after sending a signal to the switching element to electrically isolate the motor from the motor control device and upon completion of the time delay to send a signal to the switching element to electrically couple the motor to the motor control device.

36. The overcurrent protection control system of claim 34, wherein the microprocessor is further configured to disregard the second threshold current value when operating in the first operational state and disregard the first threshold current value when operating in the second operational state.

37. A method of operating an overcurrent protection control system, comprising:
assigning a first threshold current value of the control system for a first operational state of the motor;
assigning a second threshold current value of the control system for a second operational state of the motor;
comparing a sensed current amount with the first threshold current value, while disregarding the second threshold current value, during the first operational state of the motor;
comparing the sensed current amount supplied to the motor with the second threshold current value, while disregarding the first threshold current value, during the second operational state of the motor; and
electrically isolating a power source from the motor if the sensed current amount exceeds the first threshold current value during the first operational state of the motor; and
electrically isolating the power source from the motor if the sensed current amount exceeds the second threshold current value during the second operational state of the motor.

* * * * *